United States Patent [19]
Marshall et al.

[11] Patent Number: 5,685,666
[45] Date of Patent: Nov. 11, 1997

[54] DEVICE FOR FASTENING ELEMENTS TOGETHER

[75] Inventors: Ronald James Marshall, Sinnamon Park; Robert Francis Charlton, Pullenvale, both of Australia

[73] Assignees: Viscount Plastics Pty. Ltd.; Pioneer Building Products (Qld) Pty. Ltd., both of Queensland, Australia

[21] Appl. No.: 495,517

[22] PCT Filed: Jan. 7, 1994

[86] PCT No.: PCT/AU94/00012

§ 371 Date: Jul. 28, 1995

§ 102(e) Date: Jul. 28, 1995

[87] PCT Pub. No.: WO94/18392

PCT Pub. Date: Aug. 18, 1994

[30] Foreign Application Priority Data

Feb. 4, 1993 [AU] Australia .................. PL7104

[51] Int. Cl.[6] .................. E01C 5/00; E04B 1/38; F16B 1/00
[52] U.S. Cl. .................. 404/40; 52/582.2; 411/46; 411/60; 403/293; 403/297
[58] Field of Search .................. 404/34, 37, 40, 404/47, 7, 35; 403/292, 293, 297, 298; 52/512, 582.1, 582.2, 584.1, 585.1; 411/45, 46, 55, 48, 60, 84, 338, 339, 966

[56] References Cited

U.S. PATENT DOCUMENTS

| 2,082,316 | 6/1937 | Williams . | |
|---|---|---|---|
| 3,456,706 | 7/1969 | Ollis, Jr. . | |
| 4,293,261 | 10/1981 | Frana . | |
| 4,430,837 | 2/1984 | Kirschenbaum | 404/40 X |
| 4,454,699 | 6/1984 | Strobl | 403/298 X |
| 4,568,584 | 2/1986 | Holland | 404/40 X |
| 4,571,135 | 2/1986 | Martin . | |
| 4,577,448 | 3/1986 | Huworth | 404/40 X |
| 4,697,294 | 10/1987 | Schafer | 404/40 X |
| 5,103,616 | 4/1992 | Nordberg | 52/585.1 |
| 5,403,637 | 4/1995 | Pickard et al. | 404/40 X |
| 5,433,053 | 7/1995 | Tulloch | 52/582.2 X |

FOREIGN PATENT DOCUMENTS

| 831566 | 3/1960 | United Kingdom | 404/40 |
|---|---|---|---|
| 983071 | 2/1965 | United Kingdom | 404/40 |

*Primary Examiner*—James Lisehora
*Attorney, Agent, or Firm*—Renner, Otto, Boisselle & Sklar, P.L.L.

[57] ABSTRACT

A device for connecting pavers (11, 12) together to form roads comprises a base plate (17) from which extend tubular projections (18). The tubular projections can extend into bores (13, 14) formed in the pavers and a fastener (20) is provided which can lock the paver to a respective projection. Typically, the device has four projections to allow four pavers to be locked together.

5 Claims, 3 Drawing Sheets

DEVICE FOR FASTENING ELEMENTS TOGETHER

FIELD OF THE INVENTION

This invention relates to a device for fastening a plurality of elements together and particularly relates to a device which can releasably fasten blocks or pavers together.

The elements, when fastened together, find applicability in preventing soil erosion, soil and sand stabilisation, revetments, road surfaces, stabilisation of embankments against erosion by water, sea walls and the like.

BACKGROUND ART

Known systems as described above generally comprise either individual elements joined together, or rolls or mats of flexible material. The disadvantage with rolls or mats is that they are generally lightweight in structure (to allow them to be transported and placed on site), and this makes them generally unsuitable for heavy duty applications, and especially for use in providing a load-bearing surface, such as a road surface.

For heavy duty applications, separate elements, such as pavers or blocks, are generally used which are connected together to prevent or minimise spreading of the blocks. To date however, there has not been a simple and efficient type of fastening device to fasten the blocks or pavers together. One fastening technique is to place the blocks on a friction mat, or on some form of backing which will prevent the blocks from separating. However, this arrangement is deficient in that it does not firmly lock the blocks together. Thus, these blocks can occasionally be lifted, especially by the action of a vehicle wheel. It is also known to bind blocks together with straps or bindings. This arrangement is also undesirable when used as a road surface as there is still too much movement between adjacent blocks.

For road pavers, there is generally a requirement for the pavers to have a generally flush top surface to provide a flat road surface for vehicles. This also generally requires that the edges between adjacent pavers are to be substantially flush with each other and are not to sag under load conditions. Again, this requirement makes straps and other forms of binding generally unsuitable.

OBJECT OF THE INVENTION

The present invention has been developed to provide a device which can releasably lock elements such as pavers and blocks together and which may overcome the above-mentioned disadvantages and/or provide the public with a useful choice.

In one form, the invention resides in a device for fastening a plurality of elements together, the elements having a bore extending therethrough between an upper surface and a lower surface, the device comprising a base plate adapted to be positioned below the lower surface of a said element, a plurality of projections extending from the base plate, one said projection being adapted to pass at least partially into the bore of one said element, and another said projection being adapted to pass at least partially into the bore of another element, and securing means to secure the device to the said elements.

The elements may comprise pavers, blocks and suitably comprise pavers. The pavers may include a plurality of bores extending therethrough. Each paver may include substantially planar upper and lower surfaces. Suitably, each of the pavers are of a similar thickness.

The base plate of the device may be sized to be extendible under a portion of the lower surface of a respective element. The base plate may be substantially planar and although it may comprise any type of configuration, is preferably substantially rectangular when viewed in plan. The base plate may have a degree of flexibility to prevent it from being cracked or broken upon application of a load to the elements. Thus, the base plate may be formed from a plastics material. Typically, the base plate has a length dimension of about 20 to 60 centimeters.

The projections may extend substantially at right angles relative to the base plate. The number of projections may vary depending upon the number of elements to be fastened together. Thus, the base plate may include four projections to fasten four elements together, two projections to fasten two elements together, and the like. Each element may include a plurality of bores, and a plurality of projections may extend into the bores. This may necessary in situations where enhanced fastening is required.

The projections may be integrally formed with the base plate and may comprise plastics. Suitably, the projections are of a length to extend at least mid-way through the bore in the respective element. The projections may be of any particular cross-section, but suitably are substantially cylindrical in design. The projections may be tapered from a wider base to a narrower top to facilitate insertion into the bore.

The securing means may be engageable with the projections. Suitably, separate securing means are provided for each projection. The securing means may comprise a fastener which may be attachable to a said projection to fasten the device to the element. The fastener may be threadingly engageable with a respective projection and may be rotatably insertable thereto. The fastener may include a portion which engages with the element adjacent an upper surface therof. Thus, the fastener may include a lip or like structure which may locate within a recess on an upper surface of the element. Alternatively, the securing means may comprise a "twist lock arrangement" whereby the securing means may be rotatably supported by the projection between a first position where the element can be removed from the device, and a second position where the element is locked to the device. In yet a further alternative, a biasing means may be provided to bias the fastener to the base plate.

In a further alternative, the projections may be outwardly deformable and the fastener may comprise a plug which can be pressed into the top of a projection to deform the projection to grip the wall of the bore in the element.

BRIEF DESCRIPTION OF THE DRAWINGS

An embodiment of the invention will now be described with reference to the following drawings in which.

BEST MODE

Figure 1:
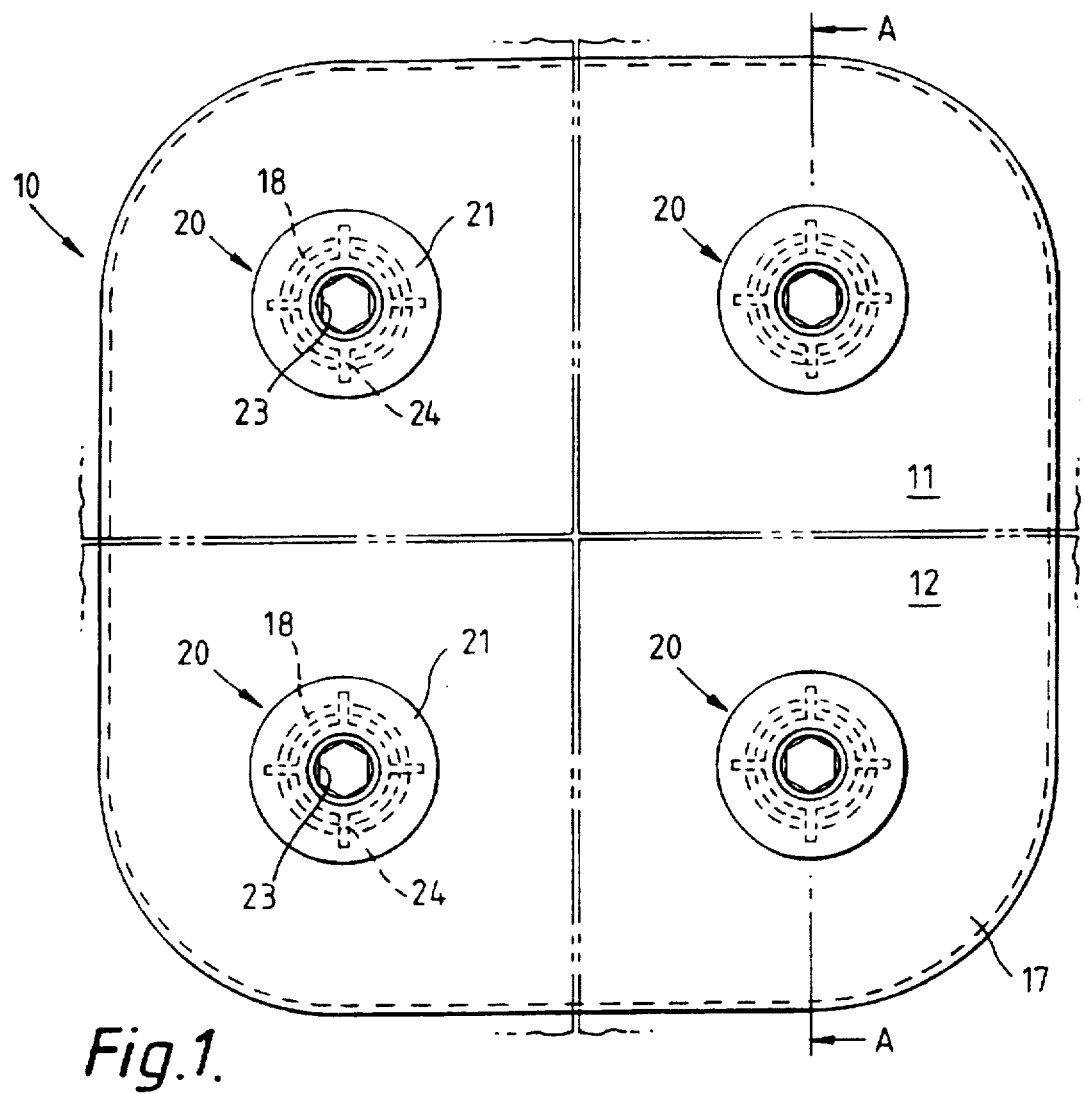
FIG. 1 is a plan view of the device according to an embodiment of the invention.
Figure 2:
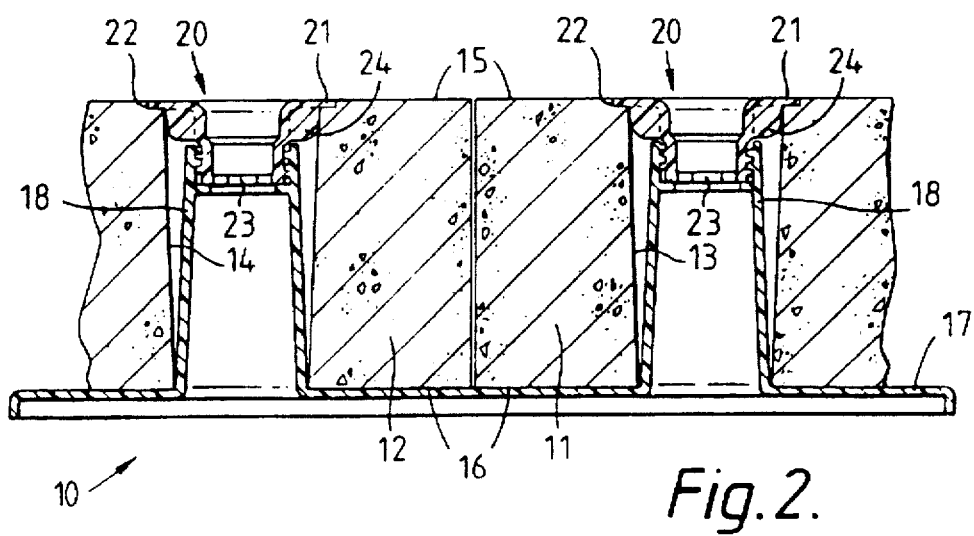
FIG. 2 is a section on A—A of the device attached to a pair of elements.

Referring to FIGS. 1 and 2, there is disclosed a device 10 for fastening a plurality of elements together. In the embodiment, elements 11, 12 comprise concrete pavers having bores 13, 14 extending therethrough between upper surfaces 15 and lower surfaces 16. Each of elements 11, 12 comprise substantially rectangular concrete pavers.

Device 10 includes a base plate 17 formed of plastics and which in the embodiment is approximately 30 centimeters in width. Base plate 17 is also approximately 2-10 millimeters thick. Base plate 17 is formed from a semi-flexible plastic such as polypropylene to allow it to slightly flex under load conditions to prevent it from being sheared, broken or otherwise damaged.

Extending from base plate 17 are a plurality of projections 18 (better shown in FIG. 2). Projections 18 are of tapered cylindrical configuration to facilitate their insertion through the bores in elements 11, 12. Projections 18 are also substantially hollow. Each projection 18 extends substantially through a respective bore, and in the embodiment, extends to adjacent the upper surface 15 of elements 11, 12. This facilitates manipulation of the securing means as will be described in greater detail below.

The projections 18 can be fastened by securing means in the form of fasteners 20. Fasteners 20 are formed from plastics and are threadingly engageable with an upper portion of projections 18 as illustrated in FIG. 2. Fasteners 20 can be rotatably threadingly engaged with projections 18 and can be rotated into and from the respective projection. Fasteners 20 are provided with an external flange or lip 21 which locates within a shoulder portion 22 in the upper surface 15 of a respective element. Thus, when fastener 20 is rotatably inserted into projection 18, it ends up being flush with upper surface 15. This is particularly desirable if elements 15 are used as a road surface. Fasteners 20 are provided with an internal socket-shaped recess 23 into which an appropriate tool can be inserted to tighten or remove fastener 12 from projection 18. Strengthening ribs 24 are provided spaced about fastener 20.

In use, and particularly with the device as illustrated in FIG. 1, four elements or blocks can be fastened together by device 10. The blocks are initially abutted together over device 10 such that the projections 18 extend through the respective bores in the blocks. Thereafter, fasteners 20 can be rotatably inserted into respective projections 18 and tightened. This arrangement then results in the blocks being locked together, although they can be removed for the purposes of repair or inspection.

By ensuring that base plate 17 is firmly pressed adjacent the lower surfaces 16 of elements 11, 12, there is little or no likelihood of sand or dirt coming between base plate and the lower surface of a respective element, which can cause the pavers to lift. Furthermore, base plate 17 functions to hold adjacent elements 11, 12 together without sagging.

Base plate 17 may be provided with ground holding lugs, projections or the like (not shown) to firmly hold the device into the ground surface.

Furthermore, base plate 17 may be formed with a groove or recess extending therealong, to allow the base plate to be cut or deliberately broken into a plate having only two projections. The plate with two projections are useful for interlocking only two blocks together, and find particular use in the outer edges of a road surface formed from such blocks or pavers. Thus, rather than needing to manufacture different sized devices, a single device can be manufactured and optionally cut for different uses.

Figure 3:
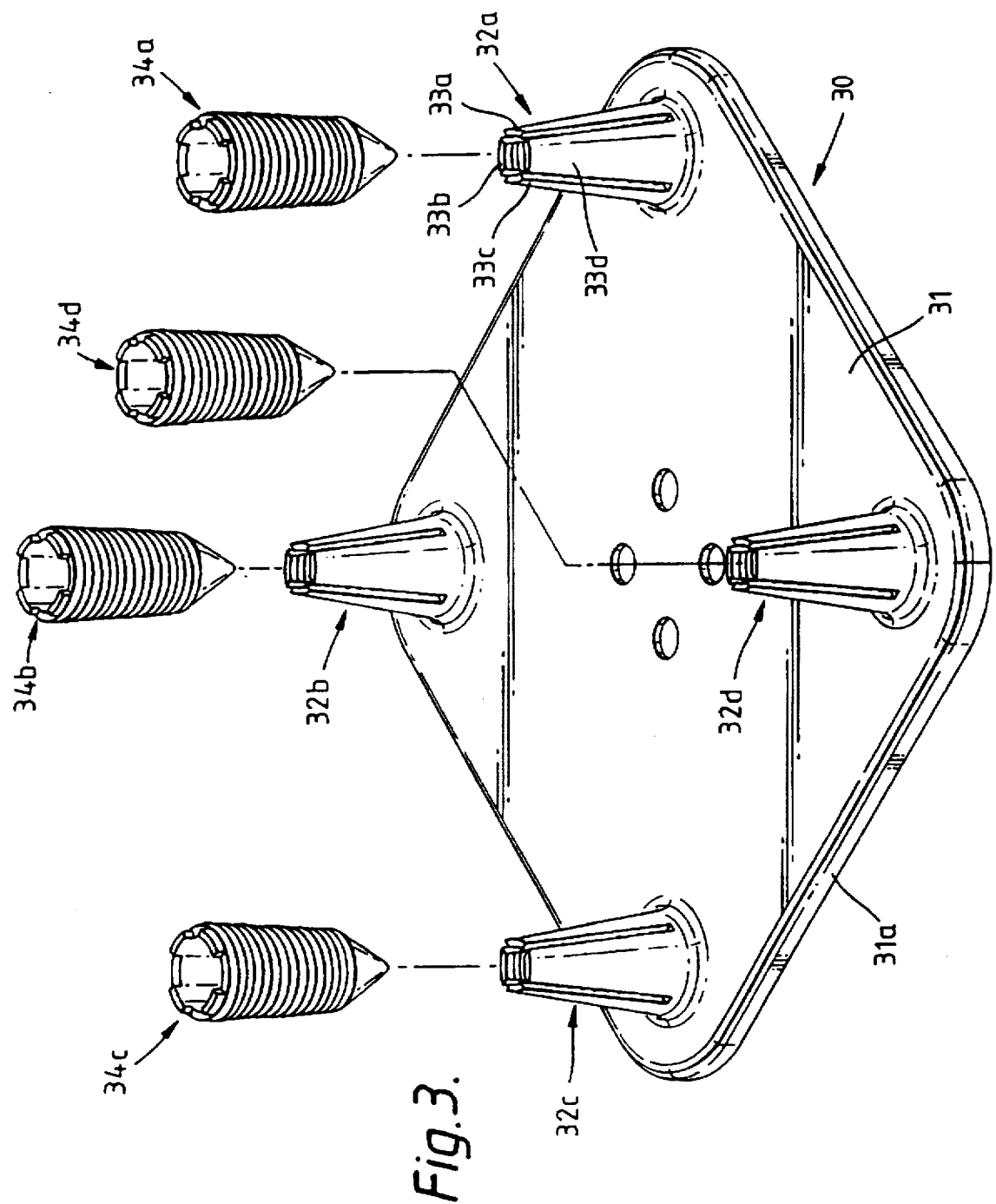
FIG. 3 is a perspective view of a device according to an alternative embodiment.
Figure 4:
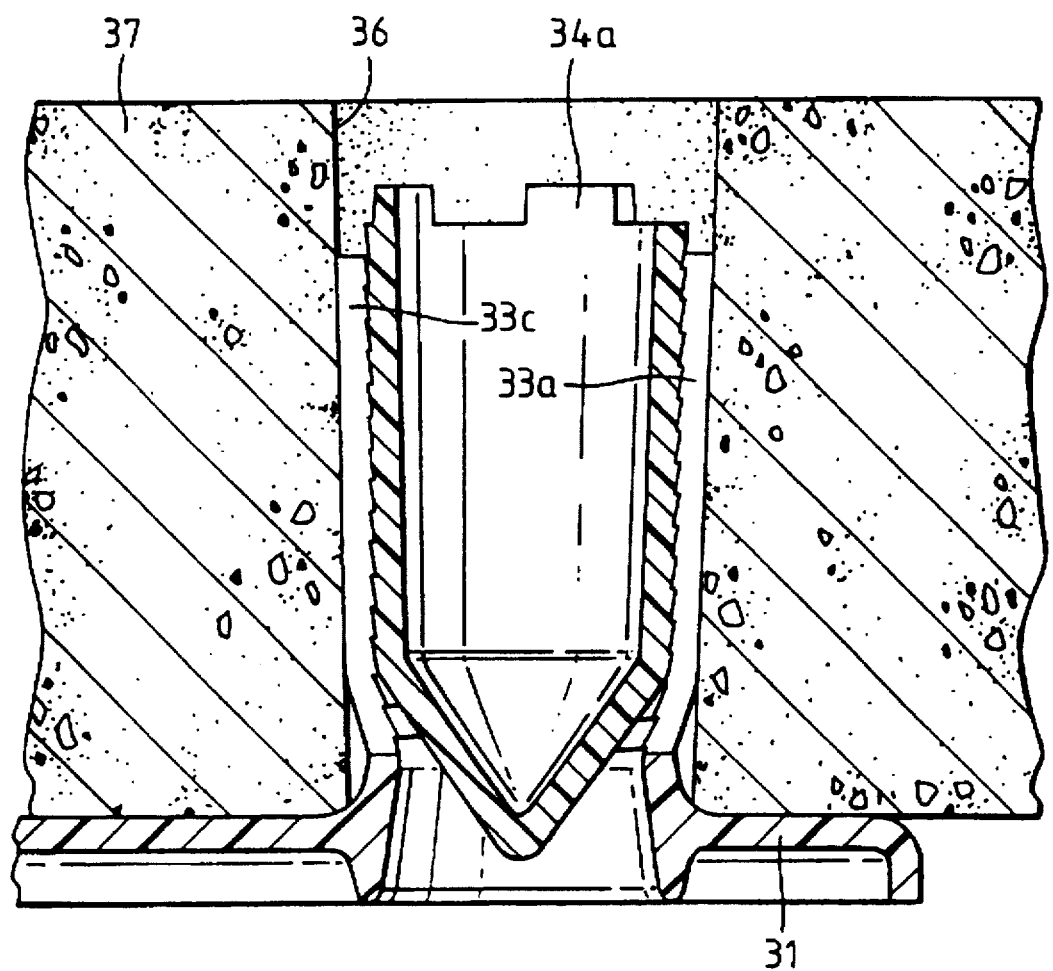
FIG. 4 is a section view of the device of FIG. 3.

FIGS. 3 and 4 illustrate an alternative embodiment of the device, the device 30 again includes a base plate 31 formed from a semi-flexible plastic such as polypropylene, and which is substantially square when viewed in plan with an edge length of approximately 30 cm. Base plate 31 includes a peripheral depending flange 31a which is approximately 10 mm wide. By having base plate 30 manufactured from semi-flexible plastic, it can slightly flex under load conditions to prevent it from being damaged or broken when fastening concrete pavers together.

Extending from base plate 31 are four projections 32a–d, each projection extending substantially at right angles form base plate 31 and being located adjacent the four corners of the base plate. The projections 32a–d are hollow and each comprises four deformable fingers (see for instance 33a–d) which are joined to a common base, with each finger 33a–d being separate from each other finger. The fingers are tapered from a wider base to a narrower top to facilitate insertion of the projection into a bore in the concrete paver (see FIG. 4).

The inside wall of each finger 33a–d is ribbed (see also FIG. 4), to accept fasteners 34a–d. The fasteners 34a–d comprise hollow plastic plugs having a tapered lower nose and a ribbed outer cylindrical body. The plugs can be pushed into the respective projection which will cause the fingers of the projection to be deformed outwardly. This in turn will cause the fingers to grip the walls of the bore of a concrete paver. The ribs on the outer wall of the plugs, and the ribs on the inner wall of the fingers are also of a screw thread configuration such that the plug can either be hammered into a respective projection, or screwed in or out of the projection.

FIG. 4 shows a plug 34a located in a projection the effect of which is to force the fingers 33a and 33c of the projection outwardly and into gripping engagement with the walls 36 of a bore in a concrete paver 37.

It should be appreciated that various other changes and modifications may be made to the embodiment described without departing from the spirit and scope of the invention as claimed.

We claim:

1. A device for fastening together a plurality of elements in which each element has an upper surface and a lower surface and a bore extending therebetween, the device comprising a base plate adapted to be located against a ground surface and to be positioned below and against at least part of the lower surface of each element, a plurality of projections extending from the base plate, one said projection being adapted to pass at least partially into the bore of one said element, and another said projection being adapted to pass at least partially into the bore of another element, and a plurality of fasteners, each fastener being engageable with a respective projection to fasten a said element to the device, wherein each projection is hollow, includes an open top and comprises a plurality of outwardly deformable fingers and each fastener comprises a plug which can be pressed between the fingers to cause the fingers to deform outwardly to grip walls of the bore of the element thereby securing the element to the device.

2. The device of claim 1, wherein the fingers are substantially planar and have horizontal ribs extending across inner walls of the fingers, and the plug has a body provided with external ribs which can engage with the ribs on the fingers when the plug is pressed between the fingers.

3. The device of claim 2, wherein the base plate is rectangular when viewed in plan and a said projection is positioned adjacent each corner of the base plate and extends substantially at right angles therefrom and each projection is tapered from a wider base to a narrower top.

4. A paving system comprising a plurality of pavers interconnected by devices as claimed in claim 1.

5. The paving system of claim 4, wherein the pavers comprise road pavers.

* * * * *